United States Patent
Malhotra et al.

(10) Patent No.: US 9,888,290 B1
(45) Date of Patent: Feb. 6, 2018

(54) SERVICE DENIAL NOTIFICATION IN SECURE SOCKET LAYER (SSL) PROCESSING

(71) Applicant: Sprint Communications Company L.P., Overland Park, KS (US)

(72) Inventors: Rajil Malhotra, Olathe, KS (US); Tania S. Mazza, Overland Park, KS (US); Chidambaram Pavanasam, Overland Park, KS (US); Badri P. Subramanyan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/080,542

(22) Filed: Mar. 24, 2016

(51) Int. Cl.
*H04N 7/16* (2011.01)
*H04N 21/475* (2011.01)
*H04L 29/08* (2006.01)
*H04N 21/254* (2011.01)
*H04N 21/4627* (2011.01)
*H04N 21/643* (2011.01)
*H04N 21/61* (2011.01)
*H04N 21/2543* (2011.01)
*H04N 21/262* (2011.01)

(52) U.S. Cl.
CPC ........ *H04N 21/4751* (2013.01); *H04L 67/02* (2013.01); *H04N 21/2541* (2013.01); *H04N 21/2543* (2013.01); *H04N 21/26225* (2013.01); *H04N 21/4627* (2013.01); *H04N 21/6125* (2013.01); *H04N 21/64322* (2013.01)

(58) Field of Classification Search
CPC ........... H04N 21/2223; H04N 21/2396; H04N 21/2393; H04N 21/2541; H04N 21/25875; H04N 21/25866
See application file for complete search history.

(56) References Cited

U.S. PATENT DOCUMENTS

| | | | | |
|---|---|---|---|---|
| 6,031,836 A | * | 2/2000 | Haserodt | H04M 1/2535 370/389 |
| 6,477,708 B1 | * | 11/2002 | Sawa | H04N 7/147 348/14.08 |
| 6,751,677 B1 | * | 6/2004 | Ilnicki | H04L 63/08 707/999.103 |
| 8,412,154 B1 | * | 4/2013 | Leemet | H04M 15/58 455/406 |

(Continued)

*Primary Examiner* — Pankaj Kumar
*Assistant Examiner* — Timothy Newlin (57) ABSTRACT

A data communication gateway. The gateway comprises a processor, a non-transitory memory, and an application stored in the non-transitory memory. When executed by the processor, the application receives a secure socket layer (SSL) client hello message identifying a server and an application layer communication protocol from a client executing on one of a user equipment (UE), a laptop computer, a notebook computer, a tablet computer, or a desktop computer and determines to deny an application layer communication service access of the client to the identified server. In response to determining to deny service access, sending a SSL server hello message comprising a client redirection extension to the client that identifies a web server configured to provide a courtesy message associated with the service denial in response to a hypertext transfer protocol (HTTP) GET message or a secure hypertext transfer protocol (HTTPS) GET message.

20 Claims, 7 Drawing Sheets

(56) References Cited

U.S. PATENT DOCUMENTS

| | | | |
|---|---|---|---|
| 8,613,072 B2 | 12/2013 | Nice et al. | |
| 8,650,283 B1* | 2/2014 | Chang | H04N 21/25875 709/224 |
| 8,719,891 B1* | 5/2014 | Aldrey | H04N 21/25866 725/105 |
| 8,843,953 B1* | 9/2014 | Dang | H04N 21/44204 725/28 |
| 9,398,320 B1* | 7/2016 | Upadhyay | H04N 21/25891 |
| 2003/0163430 A1* | 8/2003 | Takaku | H04N 7/17318 705/52 |
| 2003/0233329 A1* | 12/2003 | Laraki | G06Q 20/123 705/52 |
| 2006/0080524 A1* | 4/2006 | Kelly | G11B 20/00086 713/155 |
| 2007/0276926 A1* | 11/2007 | LaJoie | G06F 21/10 709/219 |
| 2008/0056494 A1* | 3/2008 | Jacobson | H04L 63/166 380/255 |
| 2008/0134311 A1* | 6/2008 | Medvinsky | G06F 21/33 726/7 |
| 2008/0295140 A1* | 11/2008 | Praden | H04N 7/17318 725/93 |
| 2010/0034389 A1* | 2/2010 | Sakharov | G06F 21/10 380/277 |
| 2010/0058123 A1* | 3/2010 | Yamashirodani | G03G 15/5079 714/57 |
| 2012/0311091 A1* | 12/2012 | Dingler | H04L 63/10 709/219 |
| 2012/0324567 A1* | 12/2012 | Couto | H04L 41/0853 726/12 |
| 2014/0258705 A1* | 9/2014 | Roskind | H04L 63/029 713/150 |
| 2014/0280883 A1 | 9/2014 | Pieczul et al. | |
| 2014/0337614 A1* | 11/2014 | Kelson | H04L 63/168 713/152 |
| 2014/0344894 A1* | 11/2014 | Moroney | H04L 63/10 726/4 |
| 2015/0381842 A1* | 12/2015 | Mori | G06F 3/1239 358/1.14 |
| 2016/0127317 A1* | 5/2016 | Ardeli | H04L 63/0236 726/14 |

* cited by examiner

SERVICE DENIAL NOTIFICATION IN SECURE SOCKET LAYER (SSL) PROCESSING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication service subscriptions may have periodic data volume caps that apply to the subscriptions. When a subscriber exceeds this limit, his or her request for data communication may be denied as being "over the limit" or may be charged at a per-megabyte toll over and above a periodic subscription fee. Many wireless communication service providers define data volume limits on a monthly basis and define subscription fees on a monthly basis.

The wireless communication services provided to a user equipment (UE) may be restricted by wireless communication service providers based on parental controls that may be authorized on a subscription account of the UE. For example, a teenage child may have a UE provided by his or her parents that is subject to a category of parental controls. The wireless communication service subscriber (e.g., "the parents") may select to apply different categories of parental controls on the UE. For example, they may authorize a first category of parental control to apply to the UE of an 8 year old child, a second category of parental control to apply to the UE of a 14 year old child, and a third category of parental control to apply to the UE of a 17 year old child.

SUMMARY

In an embodiment, a method of mediating data communication service is disclosed. The method comprises receiving a secure socket layer (SSL) client hello message identifying a server and an application layer communication protocol by a data communication gateway from a client executing on one of a user equipment (UE), a laptop computer, a notebook computer, a tablet computer, a desktop computer, or a set-top box and determining by the data communication gateway to deny an application layer communication service access of the client to the identified server. The method further comprises, in response to determining to deny application layer communication service access of the client to the identified server, sending a SSL server hello message comprising a client redirection extension by the data communication gateway to the client, where the client redirection extension identifies a web server configured to provide a courtesy message associated with the service denial in response to a hypertext transfer protocol (HTTP) GET message or a secure hypertext transfer protocol (HTTPS) GET message, where the web server is different from the server identified in the SSL client hello message.

In another embodiment, a user equipment (UE) is disclosed. The UE comprises a processor, a non-transitory memory, a display, a cellular radio transceiver, and an application stored in the non-transitory memory. When executed by the processor, the application establishes a first transmission control protocol (TCP) connection to a content server, sends a secure socket layer (SSL) client hello message over the first TCP connection via the cellular radio transceiver, where the client hello message identifies the content server and an application layer communication protocol, and receives a SSL server hello message over the first TCP connection via the cellular radio transceiver, where the sever hello message comprises a client redirection extension that identifies a web server, where the web server is different from the server identified in the SSL client hello message. The application further, in response to the SSL server hello message comprising the client redirection extension, tears down the first TCP connection to the content server and, in response to the SSL server hello message comprising the client redirection extension, establishes a second TCP connection to the web server. The application further sends one of a hypertext transfer protocol (HTTP) GET or a secure hypertext transfer protocol (HTTPS) GET over the second TCP connection via the radio transceiver to the web server, receives a courtesy message over the second TCP connection via the radio transceiver from the web server, where the courtesy message comprises information about a denial of communication service associated with the application layer communication protocol identified in the client hello message, and presents information from the courtesy message on the display.

In yet another embodiment, a data communication gateway is disclosed. The gateway comprises a processor, a non-transitory memory, and an application stored in the non-transitory memory. When executed by the processor, the application receives a secure socket layer (SSL) client hello message identifying a server and an application layer communication protocol from a client executing on one of a user equipment (UE), a laptop computer, a notebook computer, a tablet computer, a desktop computer, or a set-top box, and determines to deny an application layer communication service access of the client to the identified server. The application further, in response to determining to deny application layer communication service access of the client to the identified server, sending a SSL server hello message comprising a client redirection extension to the client, where the client redirection extension identifies a web server configured to provide a courtesy message associated with the service denial in response to a hypertext transfer protocol (HTTP) GET message or a secure hypertext transfer protocol (HTTPS) GET message, where the web server is different from the server identified in the SSL client hello message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Electronic devices such as mobile phones and personal computers may access content and premium communication services using application layer protocols. Access of these devices to communication services may be mediated by wireless communication service providers, by Internet service providers (ISPs), and by other enterprises. In some circumstances it is desirable to block access of a device to content and/or premium communication services. This may generally be referred to as a denial of service. For example, parental controls may be authorized for devices belonging to children, and in this case access of a child's device may desirably be blocked from accessing unsuitable content. Some premium communication services are provided on a subscription basis that is distinct from a subscription for basic communication services. When a subscriber who is in arrears on their premium subscription (or who does not have the premium subscription) attempts to access premium communication content, for example streaming video, the user's device may desirably be blocked from accessing the premium communication content or the premium communication service.

In the past access to content and premium communication services was mediated or controlled at the application communication layer. For example, when a hypertext markup language (HTML) transfer protocol (HTTP) GET request was received by a mediation gateway, the source URL (address or index identifying a source of content or service) was examined by the mediation gateway and blocked or passed on based on service rules such as those described above. If the mediation gateway decided, for example, to block access to the content, it could send a HTTP redirection message (i.e., a HTTP 302 message) to the device with a location identified in the redirection message. The device could send an HTTP GET request to that location and receive a courtesy message related to the denial of service. The courtesy message, in the case of a parental controls violation, could indicate that an attempt to access an off-limits web site had been blocked. The courtesy message may indicate that the user is not subscribed to the subject premium service that had been requested.

The courtesy message may indicate that the user is over a periodic limit of data volume consumption. Sending a courtesy message can avoid the user developing a negative opinion about the electronic device or about a communication service provider. Sending a courtesy message can avoid subscribers calling a customer care center of a wireless communication service provider because he or she thinks the electronic device or the network has failed. Avoiding unnecessary customer care calls can reduce expenses of providing the customer care service function. The courtesy message may also provide a link (e.g., a URL) to a web page that provides user input controls for selecting a communication service subscription to include premium services or to a subscription plan having a higher periodic data volume limit. The courtesy message may also provide a link to a web page to make a payment on his or her communication service subscription account.

Use of the HTTP protocol is increasingly being supplanted by use of the secure HTTP (HTTPS) protocol which encrypts the message content. Thus, such an HTTPS GET request encrypts the source URL, and the mediation gateway cannot scrutinize that source URL. Likewise, the content retrieved by the HTTPS GET request (e.g., a web page or streaming communication) cannot be accessed by the mediation gateway to filter disallowed content because the returned content is encrypted. One skilled in the art will appreciate that HTTP and HTTPS are application communication layer protocols.

The present disclosure teaches a method and system of mediating access to content and to premium communication services at the session layer, below the application layer. After an electronic device establishes a transmission control protocol (TCP) connection to a content source (a connection that may link across a mediation gateway), the device may send a secure socket layer (SSL) message such as a Client Hello message directed to the content source over the TCP connection. In this example case, the device sends the SSL message pursuant to setting up an encrypted SSL tunnel at the session layer to support HTTPS messaging at the application layer. The mediation gateway may receive the Client Hello message and perform an analysis of whether to block or allow the access to content and/or premium communication services. If the mediation gateway determines to deny service, it builds a SSL Server Hello message embedding a redirection extension parameter that identifies a location from which to retrieve an appropriate courtesy message. It is noted that the SSL protocol does not currently support such a redirection extension parameter; the present disclosure teaches revising the SSL protocol to comprise a redirection extension parameter and to standardize client (e.g., web browser) handling of redirection extension parameter.

The device receives the Server Hello message, extracts the redirection extension, terminates the TCP connection to the content source, establishes a TCP connection to a web server identified in the redirection extension, and sends an HTTP (or HTTPS) GET message to the location identified in the redirection extension parameter. The web server addressed by the GET message returns an appropriate courtesy message, for example a hypertext markup language (HTML) document (i.e., a web page) containing tagged text that, when rendered by a web browser of the device, may be presented on a display of the device The present disclosure teaches changing how the service denial or blocking analysis is performed by the mediation gateway in the context of initiation of an encrypted SSL tunnel. Because the application layer HTTPS GET message will be encrypted and not readable by the mediation gateway, rather than screening or blocking at the application layer based on URLs embedded in HTTP GET messages, the mediation gateway will screen IP addresses or domain names at the session layer, before the encrypted SSL tunnel is established. If the mediation gateway determines that the electronic device is over a predefined periodic data limit, it can deny service based on that determination alone. If the device is not over a data limit, the mediation gateway may analyze the IP address or domain name embedded in the Client Hello message and compare it to one or more blacklists or IP addresses or domain names. If the IP address or domain name is on an applicable blacklist (a parental controls category that applies to the device or a general blacklist applying to all devices), the mediation gateway may deny service. If the IP address or domain name corresponds to a premium communication service, the mediation gateway may determine whether the electronic device is associated with a subscription to the premium communication service and whether the account is in good standing. If the subscription does not exist or if the account is in arrears, the mediation gateway may deny service.

While the above describes a specific embodiment and use case, it is noted that the present disclosure teaches a technical solution that may be applicable to technical problems that may be experienced in other use cases. More specifically, the current disclosure teaches mediating data communication at a session layer and replying, by a mediating node, to a client with a parameter embedded in a message that reconfigures, restructures, or revises the on-going communication exchange. The client responds to the embedded parameter by altering the continuation of its messaging session in accordance with the embedded reply message. As a specific example, this entails adding a redirection extension parameter to the SSL protocol and adapting clients (e.g., web browsers) to respond to the redirection extension parameter. As another example, this entails adding a different extension parameter to the SSL protocol directing some other change of an otherwise customary communication sequence. In general this may be referred to as dynamic adaptation of session layer communications based on extension parameters embedded in reply messages.

Figure 1:
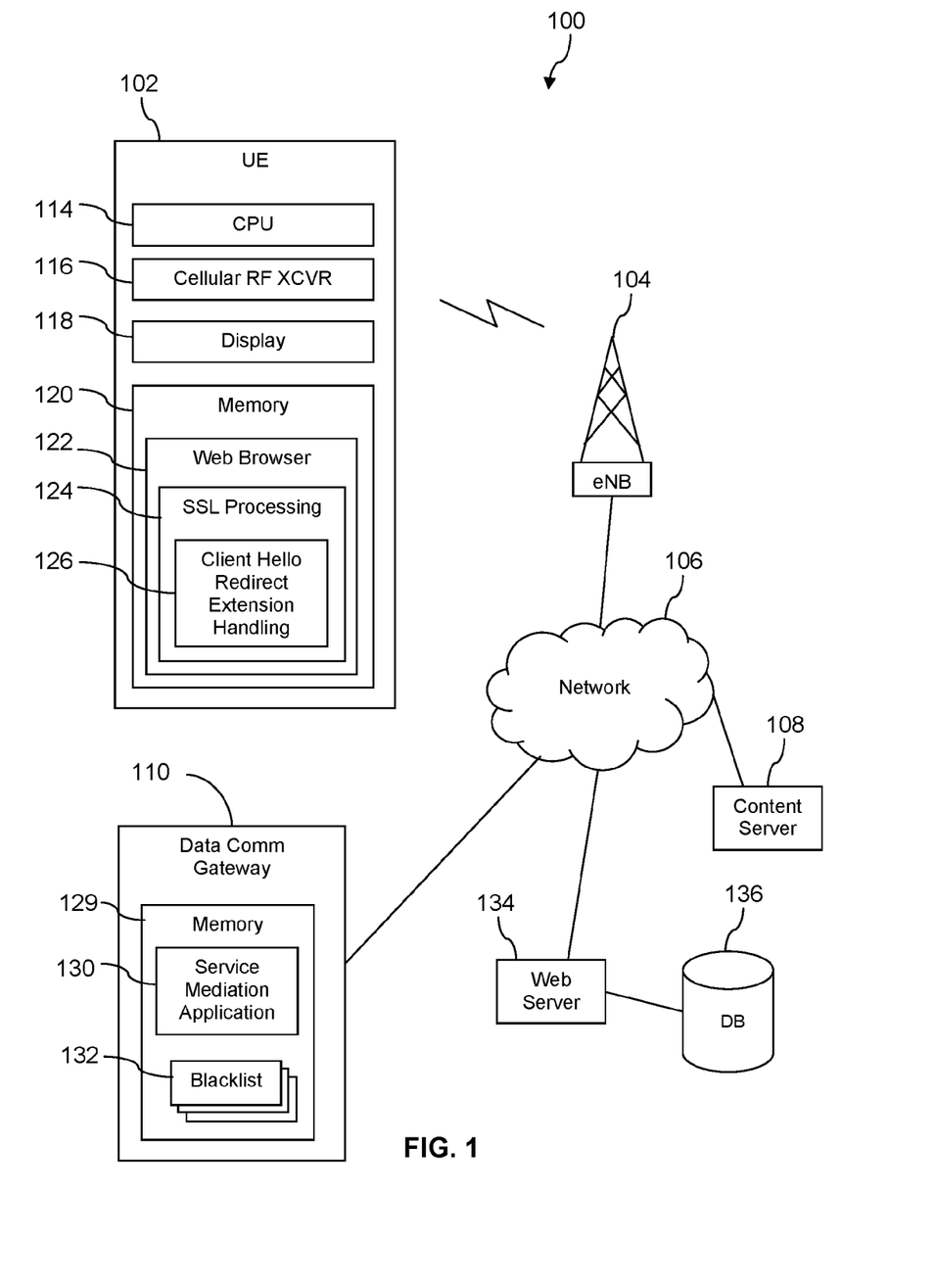
FIG. 1 is a block diagram of a communication system according to an embodiment of the disclosure.

Turning now to FIG. 1, a system 100 is described. In an embodiment, the system 100 comprises a user equipment 102, an enhanced node B (eNB) 104, a communication network 106, a content server 108, a data communication gateway 110, and a web server 134. The UE 102 may be a mobile phone, a smart phone, a personal digital assistant (PDA), a media player, a wearable computer, a headset computer, a laptop computer, a tablet computer, or a notebook computer. The eNB 104 may also be referred to as a base transceiver station (BTS) or a cell tower. The eNB 104 provides wireless communication links to the UE 102 and communicatively couples it to the network 106. The eNB 104 and the UE 102 may communicate with each other according to a long term evolution (LTE), a code division multiple access (CDMA), a global system for mobile communication (GSM), a worldwide interoperability for microwave access (WiMAX), or other cellular wireless communication protocol. The network 106 may be one or more public networks, one or more private networks, or a combination thereof. The content server 108 and the data communication gateway 110 may be implemented as computer systems. Computer systems are discussed further hereinafter.

The content server 108 may provide static content or web pages or it may provide streaming content such as video. The data communication gateway 110 may be referred to as a mediation gateway and may enforce restrictions on access of the UE 102 to the content server 108. For example, the gateway 110 may deny or block service to the UE 102 based on parental controls authorized for application to the UE 102, based on exceeding a periodic data limit defined for the UE 102 or for a subscription account associated with the UE 102, based on lack of an appropriate subscription to receive a premium communication service, or based on an overdue subscription bill or fee. In an embodiment, the gateway 110 does not block access of the UE 102 to the content server 108 or premium communication services based on an overdue base subscription bill or fee. While a single UE 102, a single eNB 104, a single content server 108, and a single web server 134 are shown in FIG. 1, it is understood that the system 100 may comprise any number of UEs 102, eNBs 104, content servers 108, data communication gateways 110, and web servers 134.

In an embodiment, the UE 102 comprises a processor 114, a cellular radio frequency (RF) transceiver 116, a display 118, and a memory 120. The memory may comprise a non-transitory portion and a transitory portion. The memory 120 stores a web browser application 122. In some contexts the web browser application 122 may be referred to as a client. The web browser application 122 comprises a component that provides secure socket layer (SSL) processing 124. The SSL processing 124 provides Client Hello message redirection extension handling 126. It is understood that it is a teaching of the present disclosure to modify conventional SSL processing by deploying the SSL processing 124 that further comprises the Client Hello message redirection extension handling 126 to support handling Client Hello message redirection extension parameters. In some contexts, a SSL Client Hello message redirection extension may be referred to as a client redirection extension. In an embodiment, the web browser application 122 is stored in a non-transitory portion of the memory 120. In an embodiment, the web browser application 122 may be stored in the non-transitory portion of the memory 120 and copied to the transitory portion of memory 120 when the web browser application 122 is loaded for execution by the processor 114.

The data communication gateway 110 comprises a memory 129 storing communication service mediation application 130 and one or more blacklists 132. The memory 129 may comprise a non-transitory portion and a transitory portion. The communication service mediation application 130 and the blacklists 132 may be stored in the non-transitory portion of the memory 129. In an embodiment, the application 130 and blacklists 132 are copied from the non-transitory portion of memory 129 to the transitory portion of memory 129 before a processor (not shown) of the data communication gateway 110 executes the application 130. The blacklists 132 identify content, communication services, uniform resource locators (URLs), IP addresses, domain names, or other indices to access content or communication service. The gateway 110 denies requests of the UE 102 to access content, communication services, URLS, IP addresses, and domain names identified in the blacklists 132 under various conditions. Some of the blacklists 132 may be associated with different levels or categories of parental controls. For example a first blacklist 132 may be used to provide a first level or category of parental control, a second blacklist 132 may be used to provide a second level or category of parental control, and a third blacklist 132 may be used to provide a third level or category of parental control. One of the blacklists 132 may be a general purpose blacklist 132 that identifies web sites or server computers associated with malware or cyber security threats. One of the blacklists 132 may be a general purpose blacklist 132 that identifies criminal web sites or server computers, such as criminals sponsoring or promoting terrorism.

The web server 134 provides courtesy messages that may be stored in data store 136 communicatively coupled to the server 134. These courtesy messages may be associated with a plurality of predefined circumstances. Different courtesy messages may be associated with each of a variety of different parental control prohibitions. Other courtesy messages may be associated with exceeding a data usage limit, for example consuming data above a limit for a monthly wireless communication service plan. Other courtesy messages may be associated with denial of service due to an unpaid bill or due to not having an active subscription for an associated premium communication service. The courtesy messages may present text on the display 118, when the courtesy message is rendered by the web browser 122, that explains the denial of service. Some of the courtesy messages may include control buttons to select to pay a delinquent subscription fee, to select to initiate and/or pay for premium subscription communication service, to select to upgrade a wireless communication service plan (whereby to increase a periodic data limit), or to remedy the denial of service in other ways. Some of the courtesy messages may embedded links to web pages that provide control inputs for upgrading subscription plans, paying delinquent subscription bills or fees, and/or adding a premium communication service.

The present disclosure teaches, at least in part, the data communication gateway 110 denying service to an application communication layer request from the UE 102 by processing at a session communication layer that returns a SSL Server Hello message embedding or encapsulating a redirection extension parameter with an index, an address, or a URL to render content from. The terms application layer and session layer refer to the Open Systems Interconnect (OSI) reference model that is well known to those skilled in the art. Much modern electronic communication is carried out by communication nodes having an architecture based on the OSI reference model. Sometimes one or more of the seven canonical layers is omitted in actual communication devices; sometimes two or more canonical layers are combined in a single layer in actual communication devices.

It is understood that the teachings of the present disclosure can readily be carried over to other electronic devices such as desktop computers, set-top boxes, and other stationary electronic devices that are communicatively coupled to the network 106 by wires rather than a wireless link. The internal architecture of these stationary devices would have all of the components of the UE 102 illustrated in FIG. 1 with the possible exception of the Cellular RF transceiver 116. In an embodiment, a stationary device (i.e., desktop computer, set-top box, or other stationary Internet enabled electronic device) that applies the teachings of this disclosure may be coupled to the network 106 by a wireless access point (AP) such as a WiFi AP, and in this case the stationary device would comprise a RF transceiver such as a WiFi transceiver or other short-range wireless transceiver that is configured to establish a wireless communication link with the wireless AP.

Figure 2:
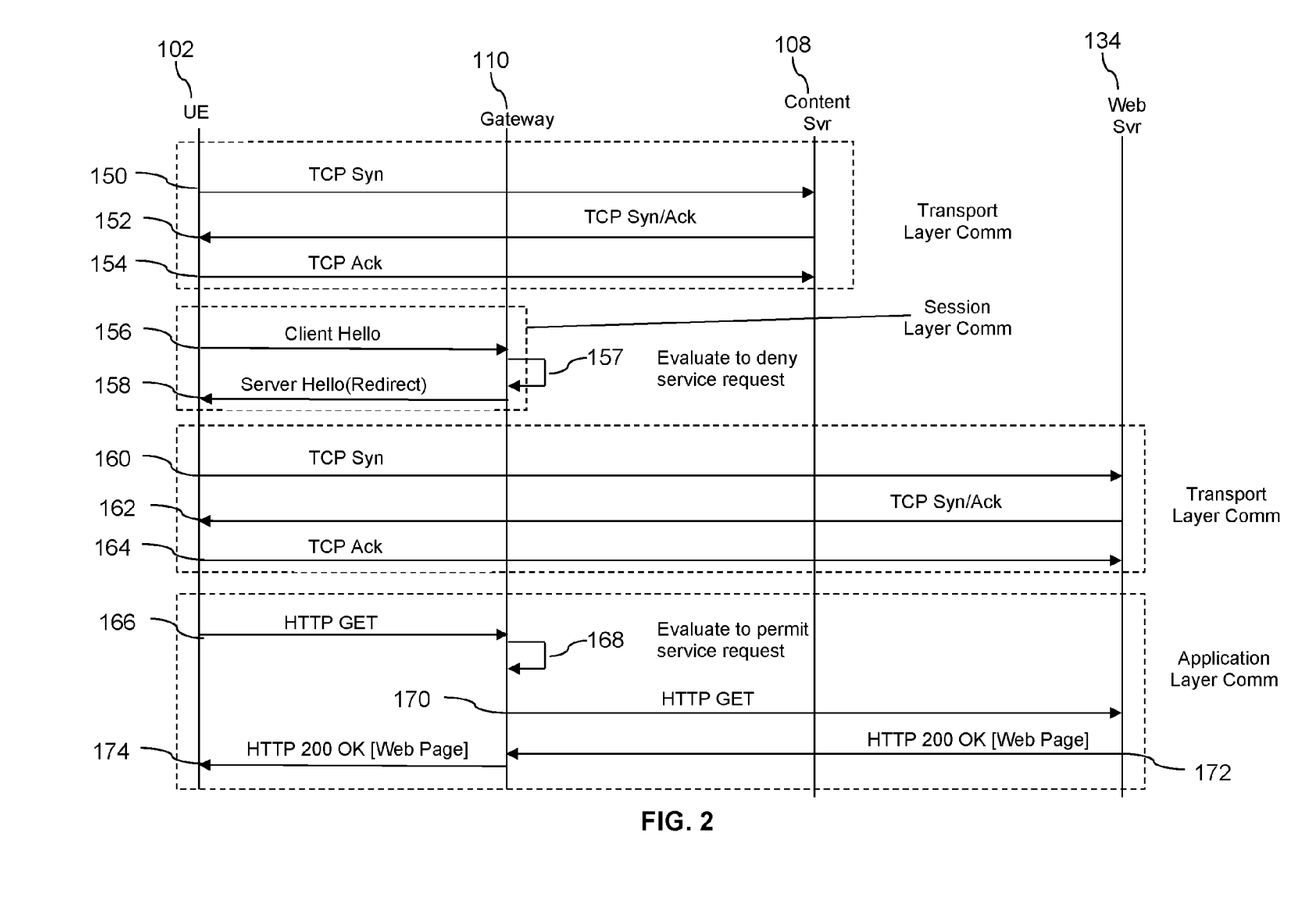
FIG. 2 is a message sequence diagram according to an embodiment of the disclosure.

Turning now to FIG. 2, a message sequence is described. The context of the message sequence may be an attempt by the UE 102 to access a communication service or content from the content server 108 that is denied by the gateway 110. More specifically, the context may be the UE 102 making an attempt to access the content server 108 according to an encrypted SSL tunnel, for example pursuant to executing a HTTPS GET request. At label 150, the UE 102 sends a TCP Syn message to the content server 108 via the data communication gateway 110 (mediation gateway). At label 152, the content server 108 sends a TCP Syn/Ack message to the UE 102 via the gateway 110. At label 154, the UE 102 sends a TCP Ack to the content server 108 via the gateway 110. The messages associated with labels 150, 152, 154 comprise communication at the transport layer and may result in the establishment of a TCP connection between the UE 102 and the content server 108 via the gateway 110.

At label 156, the UE 102 sends a secure socket layer (SSL) Client Hello message to the gateway 110. It is understood that the UE 102 sends the SSL Client Hello message via the cellular RF transceiver 116 to the eNB 104, to the network 106, to the gateway 110. The gateway 110 evaluates the SSL Client Hello message based on one or more of parental controls that apply to the UE 102, data usage limits that apply to the UE 102, blacklist restrictions, premium communication service subscriptions, and optionally other considerations. The evaluation may be based on information contained in the SSL Client Hello message such as an identity of content, of premium communication service, or of the content server 108, as described further below. The SSL Client Hello message may further identify an application layer protocol that is to be used to access the content, the premium communication service, or the content server 108, for example to identify HTTP or HTTPS or another application layer communication protocol. In the exemplary message sequence of FIG. 2, at label 157, the gateway 110 (e.g., the service mediation application 130) determines to deny the requested service.

In an embodiment, the service mediation application 130 may perform a series of analyses before denying or allowing a service request. A first analysis may comprise determining if the UE 102 is associated with a basic communication service subscription account that is in arrears or has an overdue bill pending. In another embodiment, however, the service mediation application 130 may not analyze whether the basic service account is in arrears or not: this may be an analysis performed at a different node in the communication service provider network. For example, this may be determined before granting access of the UE 102 to the radio access network (RAN), that is before allowing the UE 102 to establish a wireless communication link with the eNB 104.

A second analysis performed by the service mediation application 130 may comprise determining if the UE 102 is over a data limit or a data consumption threshold for the current reporting period, for example over a monthly data limit. The data limit or data consumption threshold may be defined in a service plan of the UE 102. It may be presumed that if the UE 102 is seeking to establish an encrypted SSL tunnel, based on the SSL Client Hello message at label 156, the UE 102 is intending to initiate a transfer of data (e.g., content) from the content server 108 to the UE 102, and this will consume further limited data relative to the subscription account. By blocking or denying the service, further exceeding the data limit of the UE 102 is avoided. A third analysis performed by the service mediation application 130 may comprise determining if the SSL Client Hello message identifies a content server 108 and/or an IP address, a domain name, a URL, or a content identity that associates to a premium communication service and, if so, checking to see if the UE 102 is subscribed to receive that premium communication service.

A fourth analysis performed by the service mediation application 130 may comprise determining if the SSL Client Hello message identifies a content server 108 and/or an IP address, a domain name, a URL, or a content identity that associates to an identity in any of the blacklists 132. More specifically, if parental controls are authorized for the service account of the UE 102, the fourth analysis may comprise determining which of a plurality of parental control categories is applicable and determining whether an identity in the Client Hello message matches an identity in the applicable parental control category. The fourth analysis may further comprise determining whether an identity in the Client Hello message matches an identity in other applicable blacklists 132, for example a general blacklist of suspected criminal web sites (e.g., terrorists) and/or a malware blacklist of suspected cybercrime web sites.

When an identity in the SSL Client Hello message matches a blacklist identity, the service request is denied. When an unsubscribed premium communication service is requested, the service request is denied. If the UE 102 is over the data limit, the service request is denied.

At label 158, the gateway 110 sends a SSL Server Hello message containing a redirection extension that identifies a courtesy message stored in the data store 136 and accessible via the web server 134. In some contexts, the redirection extension may be referred to as a client redirection extension. For example, the redirection extension comprises a URL identifying the subject courtesy message and/or a web page that encapsulates the courtesy message. It is understood that the UE 102 receives the SSL Server Hello message via the cellular RF transceiver 116 via the eNB 104 and the network 106 from the gateway 110. The messages at label 156 and 158 comprise communication at the session layer, specifically SSL protocol communications. It is understood that the gateway 110, when it determines to deny the requested service to the UE 102, may relay the SSL Client Hello message to the content server 108 and receive a SSL Server Hello message back from the content server 108 and then discard or destroy the received SSL Server Hello message.

In response to receiving and interpreting the SSL Server Hello message containing the redirection extension, the UE 102 establishes a TCP connection at labels 160, 162, 164 with the web server 134, messages that comprise communication at the transport layer. At label 166, the UE 102 sends a HTTP GET message to the gateway 110. At label 168, the gateway 110 may evaluate the HTTP GET message to determine if the communication service is to be permitted or denied and determines it will be permitted. At label 170, the gateway 110 relays the HTTP GET message to the web server 134. In embodiment, instead of sending a HTTP message, the UE 102 may send a HTTPS GET message to the web server 134, which entails setting up an encrypted SSL tunnel after the TCP connection and prior to sending the HTTPS GET message through the encrypted SSL tunnel.

The web server 134 may access a courtesy message whose URL is contained in the HTTP GET, for example retrieving the courtesy message from the data store 136. The courtesy message may be embedded as a hypertext markup language (HTML) document in a web page. The courtesy message may comprise active controls or interface control buttons or fields. The courtesy message may comprise links to other web pages, for example links to a web page for upgrading a subscription account, links to a web page to pay a delinquent premium communication service subscription fee, links to a web page to subscribe to a premium communication service, and the like. At label 172, the web server 134 sends the courtesy message embedded in an HTTP 200 OK message to the gateway 110, and at label 174, the gateway 110 relays the HTTP 200 OK message to the UE 102. As illustrated in FIG. 2, the HTTP 200 OK message may carry a HTML document (i.e., a web page) with it. Alternatively, the web server 134 may send a HTTPS 200 OK message to the UE 102 via the gateway 110, in the case where the UE 102 established an encrypted SSL tunnel with the web server 134.

The web browser 122 of the UE 102 may render the HTML document or web page provided in the HTTP 200 OK message (or the HTTPS 200 OK message) and present text and links on the display 118. The text may provide an explanation of why the requested communication service request was denied. For example, the text may indicate that the content server 108 that the UE 102 attempted to browse to is prohibited by parental controls on the UE 102 or by cyber security policies of the wireless communication service provider. For example the text may indicate that the UE 102 is over its data limit for the on-going subscription account period or that the UE 102 is not subscribed for the premium communication service requested. The text may indicate that the premium communication service account of the UE 102 is in arrears and a payment is overdue. Links may be embedded in the text presented on the display 118 for navigating to a web page that can be used by the UE 102 to overcome the reasons for the communication service denial, for example to pay an overdue account bill or to upgrade a subscription account.

Figure 3:
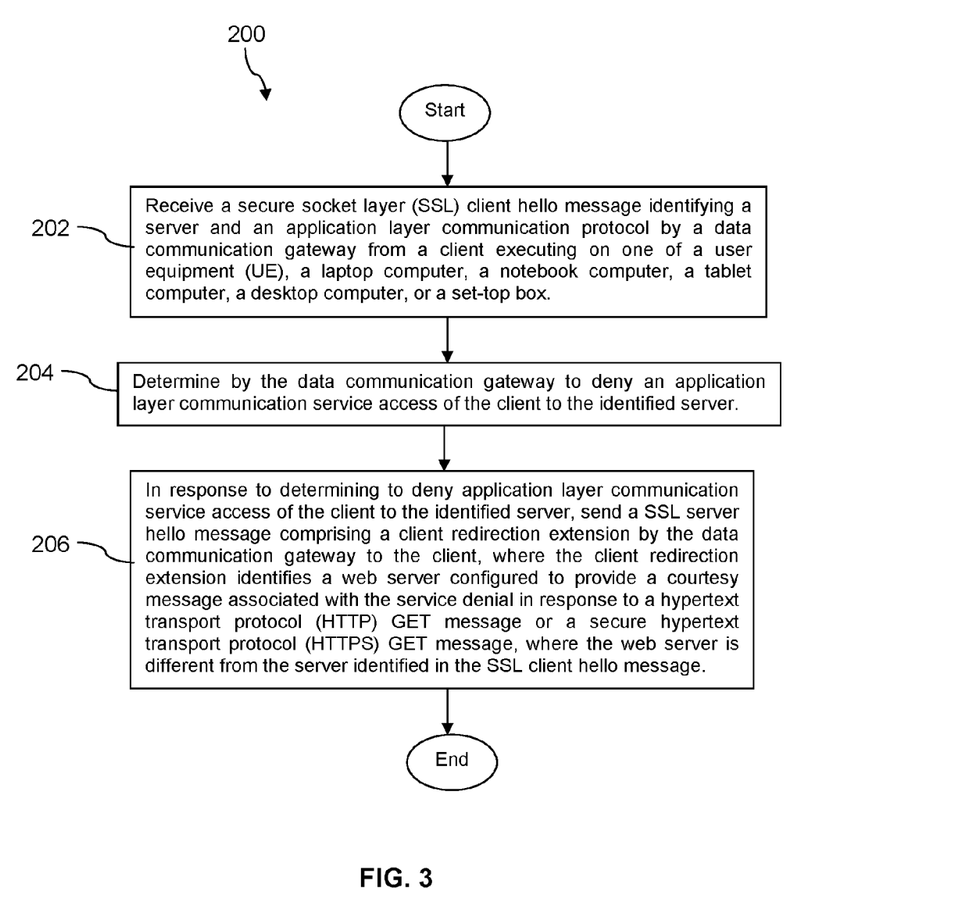
FIG. 3 is a flow chart of a method according to an embodiment of the disclosure.

Turning now to FIG. 3, a method 200 is described. The method 200 may be performed by the data communication gateway 110 to mediate data communication service, for example to mediate data communication service for the UE 102 described above with reference to FIG. 1 or for another electronic device, such as a desktop computer or set-top box. At block 202, the data communication gateway 110 receives a secure socket layer (SSL) client hello message identifying a server and an application layer communication protocol by a data communication gateway from a client executing on one of a user equipment (UE), a laptop computer, a notebook computer, a tablet computer, a desktop computer, or a set-top box.

At block 204, the data communication gateway determines to deny an application layer communication service access of the client to the identified server.

At block 206, in response to determining to deny application layer communication service access of the client to the identified server, the data communication server sends a SSL server hello message comprising a client redirection extension to the client. The client redirection extension identifies a web server configured to provide a courtesy message associated with the service denial in response to a hypertext transfer protocol (HTTP) GET message or a secure hypertext transfer protocol (HTTPS) GET message, where the web server is different from the server identified in the SSL client hello message.

Figure 4:
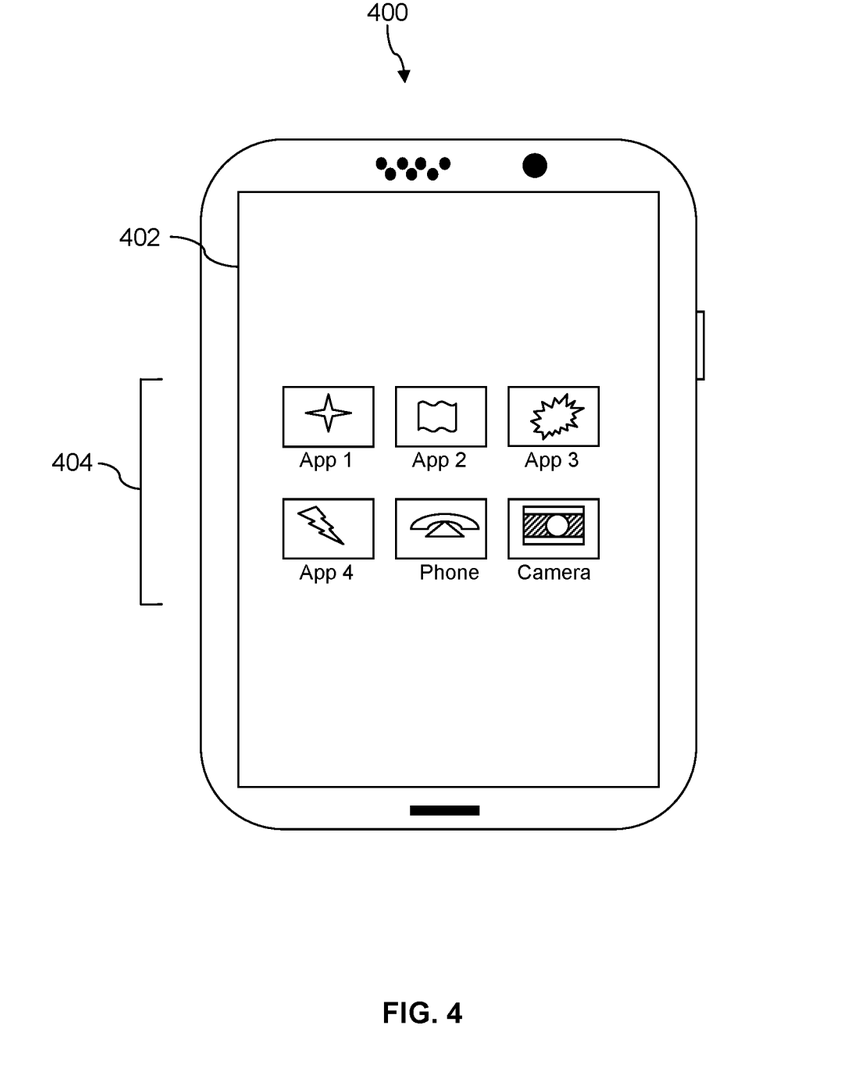
FIG. 4 is an illustration of a handset according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
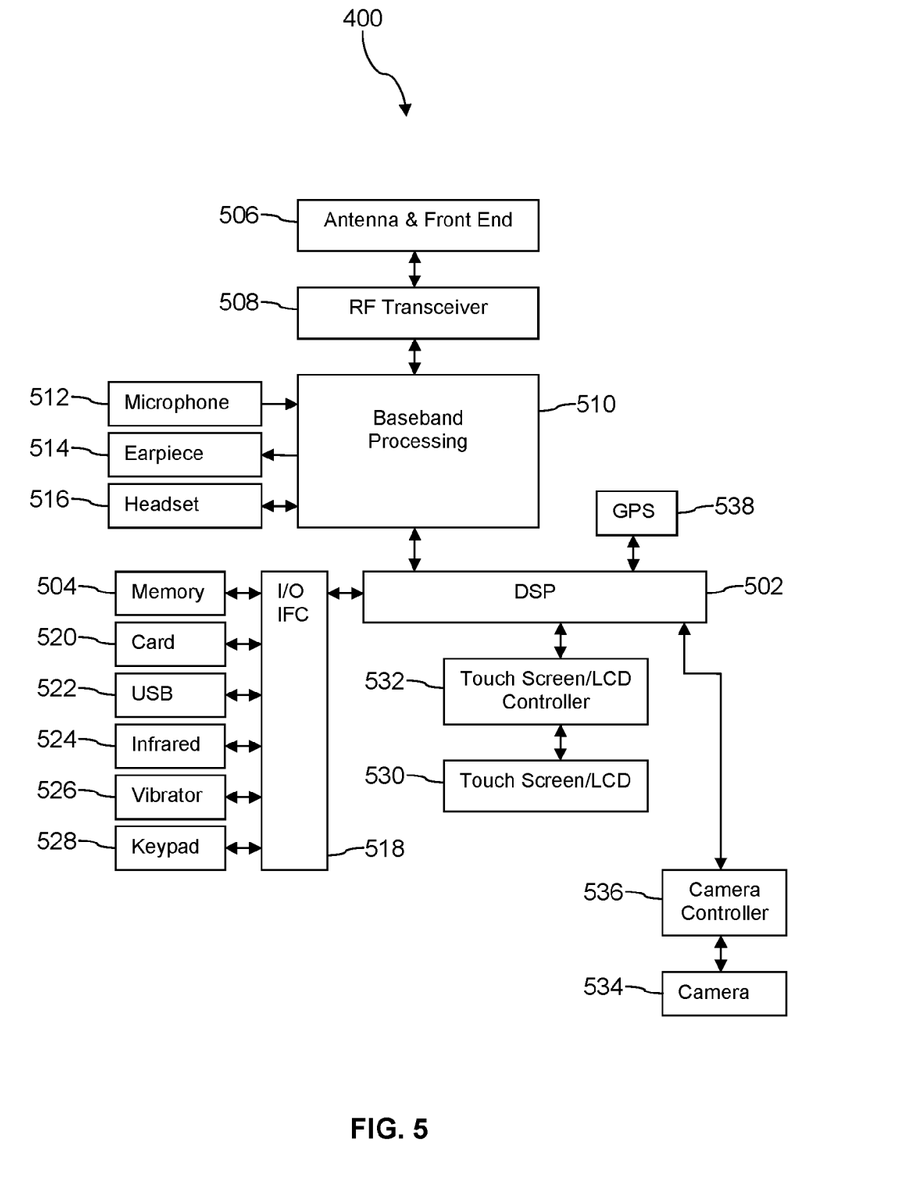
FIG. 5 is a block diagram of a hardware architecture of a handset according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
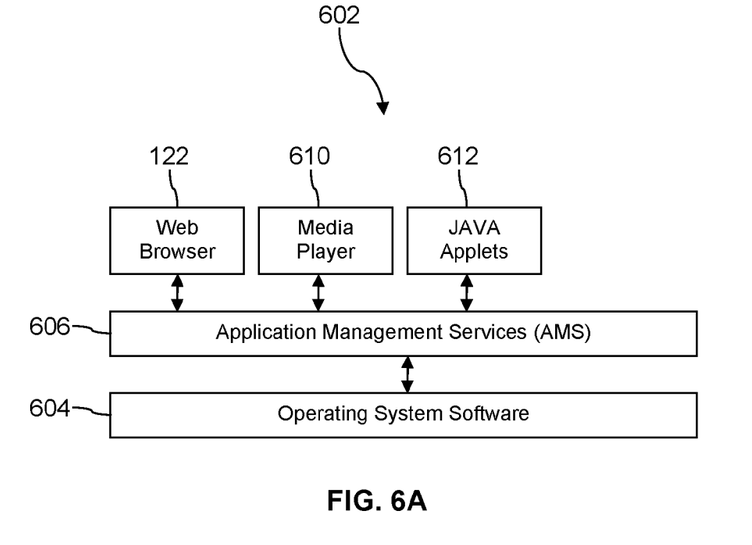
FIG. 6A is a block diagram of a software architecture of a handset according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are the web browser application 122, a media player application 610, and JAVA applets 612. The web browser application 122 may be executed by the UE 400 to browse content and/or the Internet, for example when the UE 400 is coupled to a network via a wireless link. The web browser application 122 may permit a user to enter information into forms and select links to retrieve and view web pages. The web browser application 122 provides further operational features described above with reference to FIG. 1 and FIG. 2, for example secure socket layer processing 124 that handles the client hello redirection extension disclosed herein. The media player application 610 may be executed by the UE 400 to play audio or audiovisual media. The JAVA applets 612 may be executed by the UE 400 to provide a variety of functionality including games, utilities, and other functionality.

Figure 6B:
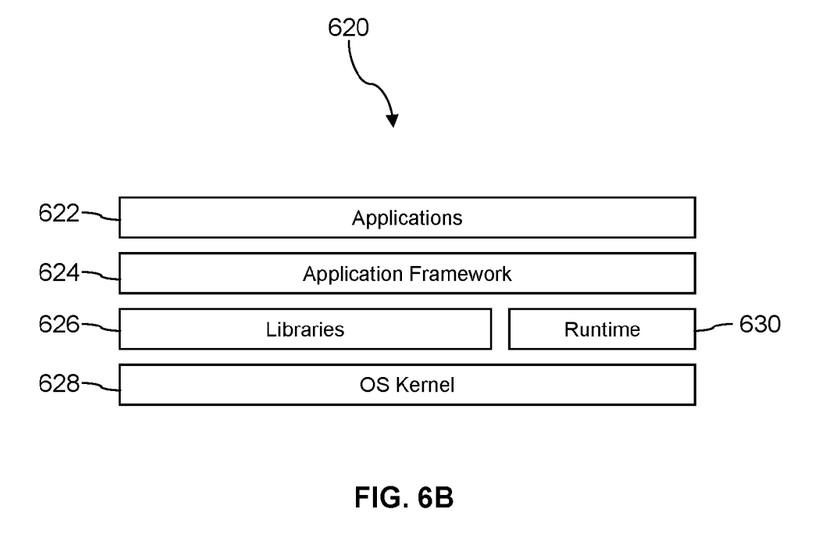
FIG. 6B is a block diagram of another software architecture of a handset according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
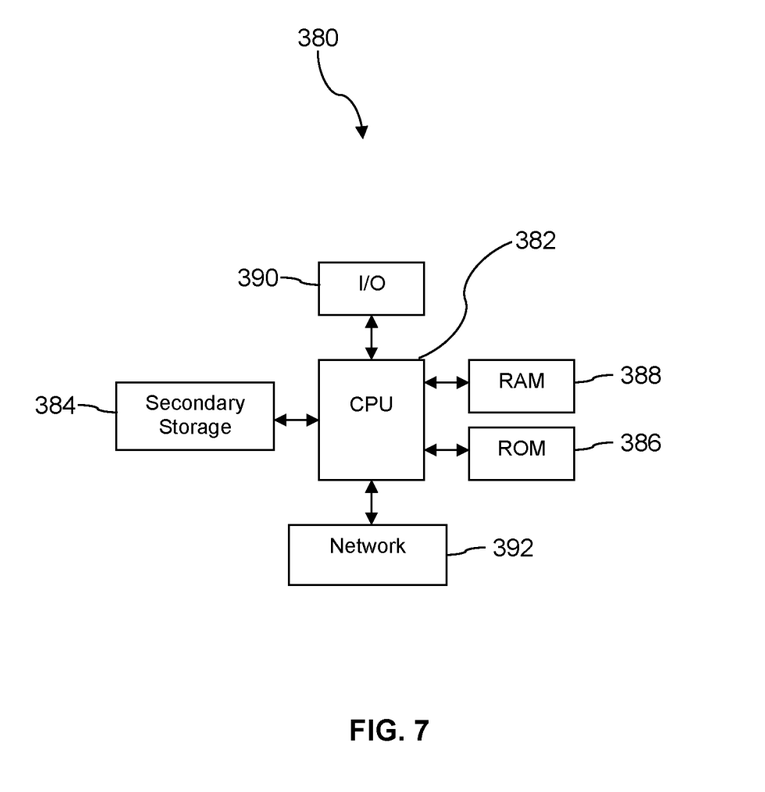
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A data communication gateway, comprising:
   a processor;
   a non-transitory memory; and
   an application stored in the non-transitory memory that, when executed by the processor:
   receives a secure socket layer (SSL) client hello message identifying a server and an application layer communication protocol from a client executing on one of a user equipment (UE), a laptop computer, a notebook computer, a tablet computer, a desktop computer, or a set-top box,
   determines to deny an application layer communication service access of the client to the identified server, and
   in response to determining to deny application layer communication service access of the client to the identified server, sending a SSL server hello message comprising a client redirection extension to the client, where the client redirection extension identifies a web server configured to provide a courtesy message associated with the service denial in response to a hypertext transfer protocol (HTTP) GET message or a secure hypertext transfer protocol (HTTPS) GET message, where the web server is different from the server identified in the SSL client hello message.

2. The data communication gateway of claim 1, wherein the non-transitory memory comprises a blacklist of domain names and Internet protocol (IP) addresses, and the application determines to deny the application layer communication service access of the client to the identified server because the server is identified in the blacklist.

3. The data communication gateway of claim 2, wherein the blacklist of domain names and IP addresses is associated with parental controls and the UE is associated with a wireless communication service subscription that has parental controls authorized for the subscription.

4. The data communication gateway of claim 1, wherein the UE is associated with a wireless communication service subscription that has parental controls authorized for the subscription, where the non-transitory memory comprises a plurality of different blacklists, where each blacklist comprises domain names and IP addresses, where some of the different blacklists are associated with different categories of parental controls and where the application further:
  determines a category of parental controls authorized for the UE,
  selects one of the blacklists stored in the non-transitory memory based on the category of parental controls authorized for the UE, and
  compares the identity of the server to the selected blacklist, and
where the application determines to deny the application layer communication service access of the client to the identified server because the server is identified in the selected blacklist.

5. The data communication gateway of claim 1, where the UE is one of a mobile phone, a personal digital assistant (PDA), a media player, a headset computer, or a wearable computer.

6. The data communication gateway of claim 1, wherein the application determines to deny the application layer communication service access of the client based on a wireless communication service subscription associated with the UE exceeding a data consumption threshold defined in a service plan of the subscription.

7. The data communication gateway of claim 6, where the courtesy message associated with the service denial provides a selection input for upgrading the service plan of the subscription.

8. The data communication gateway of claim 1, wherein the application layer communication protocol identified in the SSL client hello message is a HTTP application layer communication protocol.

9. A user equipment (UE), comprising:
  a processor;
  a non-transitory memory;
  a display;
  a cellular radio transceiver; and
  an application stored in the non-transitory memory that, when executed by the processor:
    establishes a first transmission control protocol (TCP) connection to a content server,
    sends a secure socket layer (SSL) client hello message over the first TCP connection via the cellular radio transceiver, where the SSL client hello message identifies the content server and an application layer communication protocol,
    receives a SSL server hello message over the first TCP connection via the cellular radio transceiver, where the SSL sever hello message comprises a client redirection extension that identifies a web server, where the web server is different from the server identified in the SSL client hello message,
    in response to the SSL server hello message comprising the client redirection extension, tears down the first TCP connection to the content server,
    in response to the SSL server hello message comprising the client redirection extension, establishes a second TCP connection to the web server,
    sends one of a hypertext transfer protocol (HTTP) GET or a secure hypertext transfer protocol (HTTPS) GET over the second TCP connection via the radio transceiver to the web server,
    receives a courtesy message over the second TCP connection via the radio transceiver from the web server, where the courtesy message comprises information about a denial of communication service associated with the application layer communication protocol identified in the SSL client hello message, and
    presents information from the courtesy message on the display.

10. The UE of claim 9, where the UE is one of a mobile phone, a personal digital assistant (PDA), a media player, a headset computer, or a wearable computer.

11. The UE of claim 9, where the application is a web browser application.

12. A method of mediating data communication service, comprising:
  receiving a secure socket layer (SSL) client hello message identifying a server and an application layer communication protocol by a data communication gateway from a client executing on one of a user equipment (UE), a laptop computer, a notebook computer, a tablet computer, a desktop computer, or a set-top box;
  determining by the data communication gateway to deny an application layer communication service access of the client to the identified server; and
  in response to determining to deny application layer communication service access of the client to the identified server, sending a SSL server hello message comprising a client redirection extension by the data communication gateway to the client, where the client redirection extension identifies a web server configured to provide a courtesy message associated with the service denial in response to a hypertext transfer protocol (HTTP) GET message or a secure hypertext transfer protocol (HTTPS) GET message, where the web server is different from the server identified in the SSL client hello message.

13. The method of claim 12, wherein the data communication gateway determines to deny the application layer communication service access based on a communication service subscriber associated with the UE exceeding a data consumption threshold defined in a service plan of the subscriber.

14. The method of claim 12, wherein the data communication gateway determines to deny the application layer communication service access based on the web server being identified on a blacklist.

15. The method of claim 12, wherein the data communication gateway determines to deny the application layer communication service access based on applying parental controls defined for a service plan of a communication service subscriber associated with the UE.

16. The method of claim 15, wherein determining to deny the application layer communication service access further comprises:

determining a category of parental controls authorized for the UE;

selecting a blacklist of domain names and Internet protocol (IP) addresses, where the blacklist is selected based on the category of parental controls; and comparing the identity of the server to the blacklist of domain names and IP addresses.

17. The method of claim 12, wherein the application layer communication protocol identified in the SSL client hello message is a HTTP application layer communication protocol.

18. The method of claim 12, further comprising sending a SSL client hello message by the data communication gateway to the server identified in the SSL client hello message received from the UE.

19. The method of claim 18, further comprising receiving a SSL server hello message from the server identified in the SSL client hello message received from the UE by the data communication gateway.

20. The method of claim 19, further comprising discarding by the data communication gateway the SSL server hello message received from the server.

* * * * *